May 6, 1924.
B. F. WOODS
ANTISKID ATTACHMENT FOR VEHICLE WHEELS
Filed March 31, 1923
1,493,312
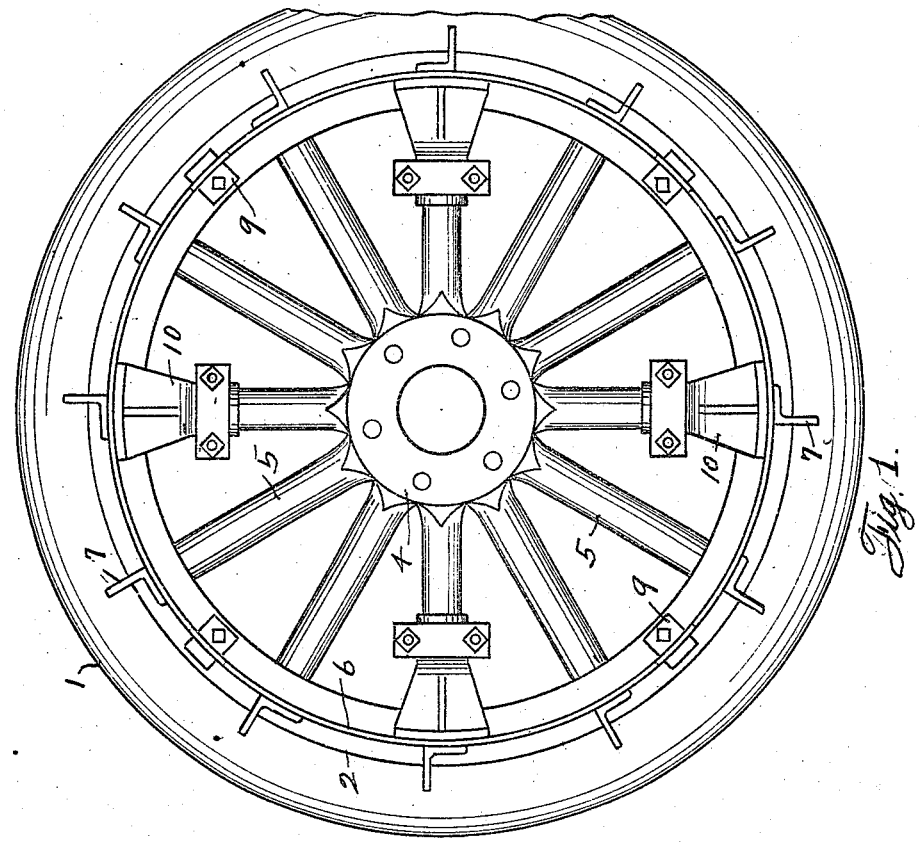
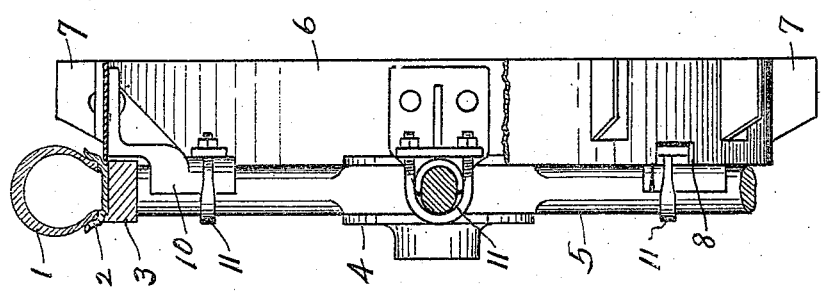
Benjamin F. Woods
INVENTOR.
BY
Hardway & Cathy
ATTORNEYS.

Patented May 6, 1924.

1,493,312

UNITED STATES PATENT OFFICE.

BENJAMIN F. WOODS, OF GOOSE CREEK, TEXAS.

ANTISKID ATTACHMENT FOR VEHICLE WHEELS.

Application filed March 31, 1923. Serial No. 629,028.

*To all whom it may concern:*

Be it known that I, BENJAMIN F. WOODS, citizen of the United States, residing at Goose Creek, in the county of Harris and State of Texas, have invented certain new and useful Improvements in Antiskid Attachments for Vehicle Wheels, of which the following is a specification.

This invention relates to new and useful improvements in an antiskid attachment for vehicle wheels.

One object of the invention is to provide an attachment of the character described specially designed to be applied to the traction wheels of a motor vehicle and which will prevent the same from skidding when passing over soft or muddy or sandy roads.

Another object of the invention is to provide an attachment of the character described which may be readily applied either to the inside or the outside of a vehicle wheel, and which will not contact with the road surface or interfere with the normal use of the vehicle while traveling over hard surfaced roads.

A still further feature of the invention is to provide an attachment of the character described which may be cheaply and easily constructed and readily applied to, or detached from, the wheel.

With the above and other objects in view the invention has particular relation to certain novel features of construction, operation, and arrangement of parts, an example of which is given in this specification and illustrated in the accompanying drawings, wherein:—

Figure 1 is a side view of a vehicle wheel with the attachment applied thereto, and Figure 2 is a sectional view thereof, showing parts in elevation.

In the drawings the numeral 1 designates the tire which is mounted on the rim 2, said rim being mounted on the felly 3 of the wheel 4. This wheel has the usual radiating spokes 5. The numeral 6 designates an annular rim which is preferably formed of relatively thin sheet metal and whose periphery carries the radiating lugs 7 which are spaced apart therearound. The inner edge of the rim is fitted against the wheel between the tire rim 2 and the felly 3 and is provided with suitable notches as 8 to receive the lugs 9 by which the tire is held on the wheel. Fastened to the inside of the rim 6 there are a suitable number of inwardly extending brackets as 10 arranged to coincide with the spokes to which they are secured and whose outer ends are relatively wide. The inner ends of these brackets are arcuate so as to fit snugly around said spokes and they are secured to the spokes by means of suitable U-bolts 11, as shown. The lugs 7 project out far enough to engage with the road surface when the vehicle is passing over soft roads where the wheel sinks down into the surface but when the vehicle is traveling on hard surfaced roads, said lugs are held clear of the surface by the tires and consequently the device need not be removed from the wheel when hard surfaced roads are reached unless so desired.

What I claim is:—

An attachment for vehicle wheels including an annular rim, outwardly projecting peripheral lugs carried thereby, inside brackets secured to said rim whose outer ends are relatively wide, and whose inner ends are arcuate, forming clamps which fit around the corresponding wheel spokes and hold said rim closely against the wheel rim, and U-bolts securing said brackets to said spokes.

In testimony whereof I have signed my name to this specification in the presence of two subscribing witnesses.

BENJAMIN F. WOODS.

Witnesses:
W. H. DUNLAY,
WM. A. CATHEY.